No. 850,706. PATENTED APR. 16, 1907.
A. A. WITHERS.
MEANS FOR INFLATING PNEUMATIC TIRES.
APPLICATION FILED AUG. 28, 1905.
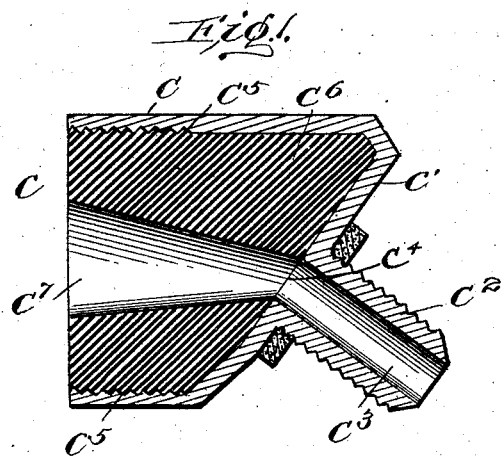
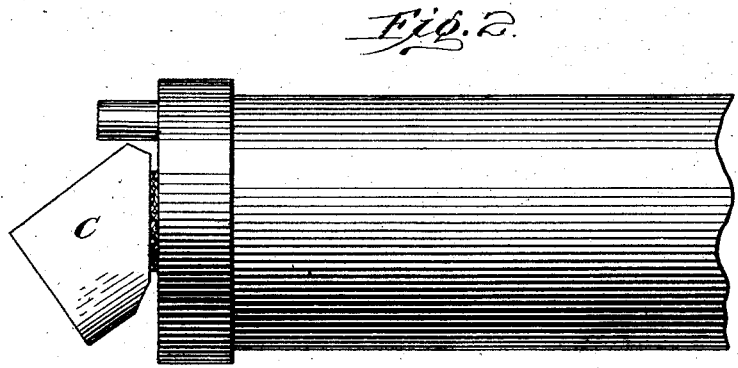
Witnesses
Inventor
Albert Arthur Withers
By Mason, Fenwick & Lawrence
His Attorneys

UNITED STATES PATENT OFFICE.

ALBERT ARTHUR WITHERS, OF BALACLAVA, VICTORIA, AUSTRALIA.

MEANS FOR INFLATING PNEUMATIC TIRES.

No. 850,706.   Specification of Letters Patent.   Patented April 16, 1907.

Application filed August 28, 1905. Serial No. 276,178.

*To all whom it may concern:*

Be it known that I, ALBERT ARTHUR WITHERS, a subject of the King of Great Britain and Ireland, residing at 17 William street, Balaclava, in the State of Victoria, Commonwealth of Australia, inventor, have invented certain new and useful Improvements in Means for Inflating Pneumatic Tires, of which the following is a specification.

The object of my invention is to provide means for inflating pneumatic tires of bicycles, tricycles, motor-cars, or other vehicles, which means shall be cheap in construction, simple in action, of long life, not liable to derangement, and by which a tire may be inflated more rapidly and with less fatigue to the operator. These consist of connections for inflater-pumps which can be readily attached to any description of existing inflaters and are adapted to readily connect with and form an air-tight joint with any form of valve at present in use upon pneumatic tires.

In the inflater-pumps hitherto made there has been a rubber tube between the connections to the said inflater-pump and the connections for the inlet portion of the valve of a tire. This rubber tube is an objectionable feature, is always liable to derangement, subject to a blow out, or has permitted the escape of air in operation. With my devices this rubber tube is dispensed with and the air is forced direct into the valve. This allows the rim of the wheel to be used as a resistance and obviates the strain upon the arm of the operator.

Referring to the drawings which form a part of this specification, Figure 1 represents a sectional elevation of the connection for use upon an ordinary form of inflater-pump at present in use, the connection constructed according to the present invention. Fig. 2 is a fragmentary view of the pump, showing the present invention applied thereto.

Referring to the drawings, which disclose one embodiment of my invention, C indicates a cup-shaped piece which is open at its outer end, but partially closed on its inner end $C'$ in the manner shown. This inner end is formed at an angle to the sides, so that the inflater-pump may be entered upon the inlet-valve from more convenient positions. Integral with the said inner portion $C'$ is a screw-threaded extension or projecting piece $C^2$. This has a hole $C^3$ therein to connect with the hole $C^4$ in the said inner portion $C'$. The cup in its interior is provided with screw-threads, as $C^5$. Into the cup I introduce in any suitable or well-known manner a composition filling, preferably of rubber, (which may or may not be vulcanized thereon.) This filling is marked $C^6$ and engages with the thread $C^5$ and remains securely embedded within the said cup C. Through the rubber or similar composition $C^6$, I drill or otherwise form a cone-shaped hole or perforation $C^7$. This is of larger diameter at the outer than at the inner portion of the said cup-piece. The hole communicates with the hole $C^4$ in the inner portion of the cup C and with the hole $C^3$ within the threaded projection $C^2$.

The cycle of operation when using the connection is simply to press the cup C over the air-inlet portion of an ordinary valve and operate the pump connected thereto until the tire is inflated. As the cone-shaped hollow $C^7$ in the rubber $C^6$ engages with the air-inlet portion of the valve it secures a firm grip on the corrugations or threads of the valve, and thus forms an air-tight joint.

Having now described my invention, what I claim as new, and desire to secure by Letters Patent, is—

A pump-nipple comprising a hollowed body portion and a securing portion formed at an angle to said body portion and threaded on the periphery thereof for securing said nipple to a pump, the hollowed-out portion of said body portion being internally threaded, and a filling for said hollowed-out portion having a conical-shaped aperture passing therethrough and a thread formed on the outer portion thereof for engaging the threads on said body portion.

In testimony whereof I affix my signature in the presence of two subscribing witnesses.

ALBERT ARTHUR WITHERS.

Witnesses:
  CECIL W. J. SLASTRIN,
  GEORGE A. U'REN.